US005438383A

United States Patent [19]

Nakashima

[11] Patent Number: 5,438,383

[45] Date of Patent: Aug. 1, 1995

[54] AUTOMATIC DEVELOPING MACHINE FOR PHOTOSENSITIVE MATERIALS

[75] Inventor: Yoshihiko Nakashima, Wakayama, Japan

[73] Assignee: Noritsu Koki Co., Ltd., Wakayama, Japan

[21] Appl. No.: 287,899

[22] Filed: Aug. 9, 1994

[30] Foreign Application Priority Data

Aug. 10, 1993 [JP] Japan ................................ 5-198145

[51] Int. Cl.$^{6}$ ................................................ G03B 3/02

[52] U.S. Cl. .................................... 354/324; 221/231; 221/277

[58] Field of Search ................ 354/324; 430/398–400, 430/265; 221/231, 266, 277, 265, 237, 273, 232, 238

[56] References Cited

U.S. PATENT DOCUMENTS 3,680,736 8/1972 Viesmann ........................ 221/231 X
4,857,950 8/1989 Takase et al. ........................ 354/324
5,318,061 6/1994 Saito ................................ 354/324 X
5,336,588 8/1994 Ueda .................................. 430/465

FOREIGN PATENT DOCUMENTS

92/20013 11/1992 WIPO .

*Primary Examiner*—D. Rutledge
*Attorney, Agent, or Firm*—Wenderoth, Lind & Ponack

[57] ABSTRACT

An automatic developing machine is proposed which is more compact. The treating tank communicates with the sub-tank through a return passage and a supply passage. In the latter passage, a pump is provided to circulate a treating solution through the treating tank and the sub-tank. To the supply passage, a tablet supply unit is connected which supplies tablets containing components for treating photographic materials.

2 Claims, 4 Drawing Sheets

AUTOMATIC DEVELOPING MACHINE FOR PHOTOSENSITIVE MATERIALS

BACKGROUND OF THE INVENTION

This invention relates to an automatic developing machine for developing photosensitive materials such as exposed films or printed photographic paper.

An automatic developing machine for developing photosensitive materials such as films and photographic paper have treating tanks filled with different treating solutions such as developing, bleaching, fixing and stabilizing solutions. Photosensitive materials are fed through these solutions in the treating tanks for development, bleaching and other treatments.

As shown in FIG. 5, a conventional means for storing such a treating solution is typically made up of a treating tank 21 and a sub-tank 22 communicating with the treating tank 21 through a return passage 23 and a supply passage 24. To maintain the activity of the treating solution, it is circulated between the treating tank 21 and the sub-tank 22 by means of a circulation pump 25 provided in the supply passage 24.

The concentration of a treating solution changes with the amount of photosensitive materials treated. If the concentration is too low, it is impossible to treat photosensitive materials properly. Thus, it is necessary to adjust the concentration according to the change.

One conventional method of adjusting the concentration of the solution in the treating tank is to store a solution having a predetermined concentration in the sub-tank. But it takes a substantial time to prepare such a solution having a predetermined concentration. Such a solution has to be stored in an extra tank provided in the developing machine. This increases the size of the developing machine.

To solve these problems, International Patent Publication WO 92/20013 proposes to supply a solid treating agent containing components necessary for the treatment of photosensitive materials into the sub-tank and dissolve it in the solution to adjust its concentration.

This type of automatic developing machine has a supply unit 26 for supplying a solid treating agent. Since it is mounted over the sub-tank 22 as shown in FIG. 5, the developing machine is rather large in size. Also, gas produced from the treating solution in the sub-tank 22 tends to rise and invade the supply unit 26. On contact with such gas, a plurality of small pieces of treating agent tend to stick together, forming larger lumps. This makes it difficult to supply a predetermined amount of treating agent into the sub-tank.

A first object of this invention is to provide a small-sized, compact automatic developing machine.

A second object is to provide an automatic developing machine which can prevent tablets used for the adjustment of solution concentration from sticking together, so that a predetermined number of tablets can be supplied reliably.

SUMMARY OF THE INVENTION

In order to attain the first object, according to the present invention, there is provided an automatic developing machine for photosensitive materials comprising a treating tank, a sub-tank communicating with the treating tank through a return passage and a supply passage, a circulating pump provided in the supply passage to circulate a treating solution between the treating tank and sub-tank, and a tablet supply unit for supplying tablets containing components necessary for the treatment of photosensitive materials, the tablet supply unit being connected to the supply passage.

In order to attain the second object, according to the second invention, there is provided an automatic developing machine for photosensitive materials wherein the tablet supply unit comprises a rotor case having a top inlet and a bottom outlet located opposite to each other, a rotor rotatably mounted in the rotor case and formed in circumferential surface thereof with a recess adapted to be alternately brought into communication with the inlet and the outlet, and a tablet case having its bottom connected to the inlet of the rotor case for containing the tablets stacked one on another, the bottom outlet formed in the rotor case communicating with the supply passage.

The tablets in the tablet supply unit are supplied one by one into the supply passage to adjust the concentration of the treating solution in the tank.

According to this invention, the tablet supply unit is connected to the supply passage through which the sub-tank and treating tank communicate. This arrangement makes it possible to reduce the size of the entire automatic developing machine, compared with the conventional arrangement in which the tablet supply unit is provided over the sub-tank.

Since tablets are supplied into the solution while circulating the solution with the circulation pump, the tablet will dissolve in the solution quickly, so that the adjustment of concentration of the solution can be made in a short period of time.

The bottom opening of the tablet case, which accommodates a plurality of tablets stacked one on another, is closed by the rotor. Thus, the tablets in the tablet case are kept out of contact with the treating solution and gas that may generate from the solution.

This prevents the tablets from sticking together, so that the tablets can be fed one by one reliably by rotating the rotor.

Other features and objects of the present invention will become apparent from the following description made with reference to the accompanying drawings, in which:

DETAILED DESCRIPTION OF THE PREFERRED EMBODIMENT

FIGS. 1–4 show an embodiment of this invention.

Figure 1:
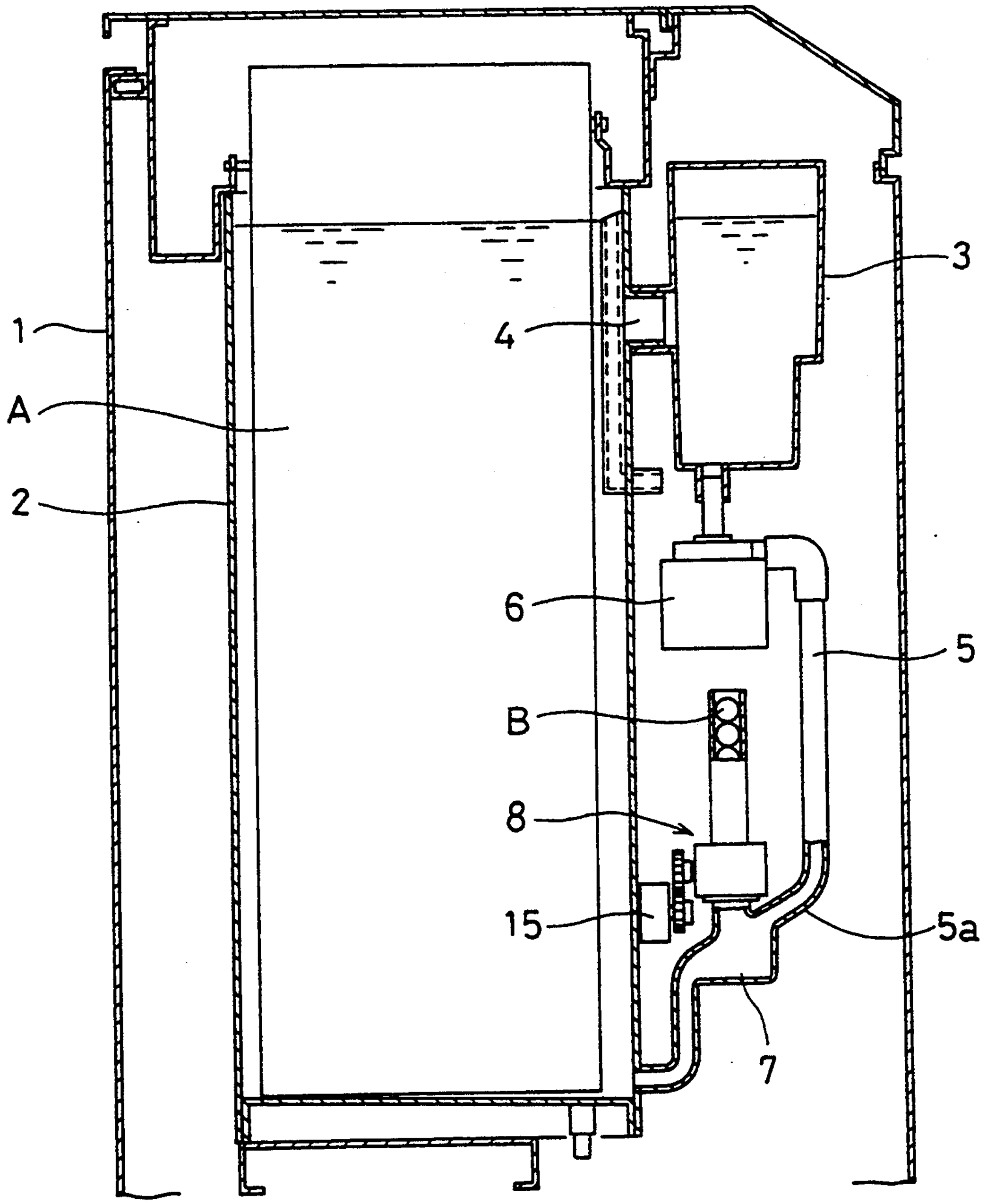
FIG. 1 is a vertical sectional front view showing one embodiment of the automatic developing machine according to this invention.

As shown in FIG. 1, treating tanks 2 are mounted in a case 1. In FIG. 1, only one of them is shown. Each treating tank 2 has a feed device A for feeding photosensitive materials.

A sub-tank 3 is mounted to one side of the treating tank 2 and communicates therewith through a return passage 4.

Also, the treating tank 2 and the sub-tank 3 communicate with each other at their lower portions through a supply passage 5. A circulation pump 6 is connected to the supply passage 5 to feed the treating solution in the sub-tank 3 to the treating tank 2. The treating solution in the treating tank 2 is discharged into the sub-tank 3 through the return passage 4. Treating solution is thus circulated between the two tanks.

The supply passage 5 has an inclined portion 5*a* provided with a tablet-reception area 7. Right over the tablet-reception area 7 is a tablet supply unit 8 for supplying tablets B into the tablet-reception area 7.

The tablets B contain components necessary for the treatment of photosensitive materials. The tablets will dissolve in the treating solution, thus increasing the concentration of the solution.

Figure 2:
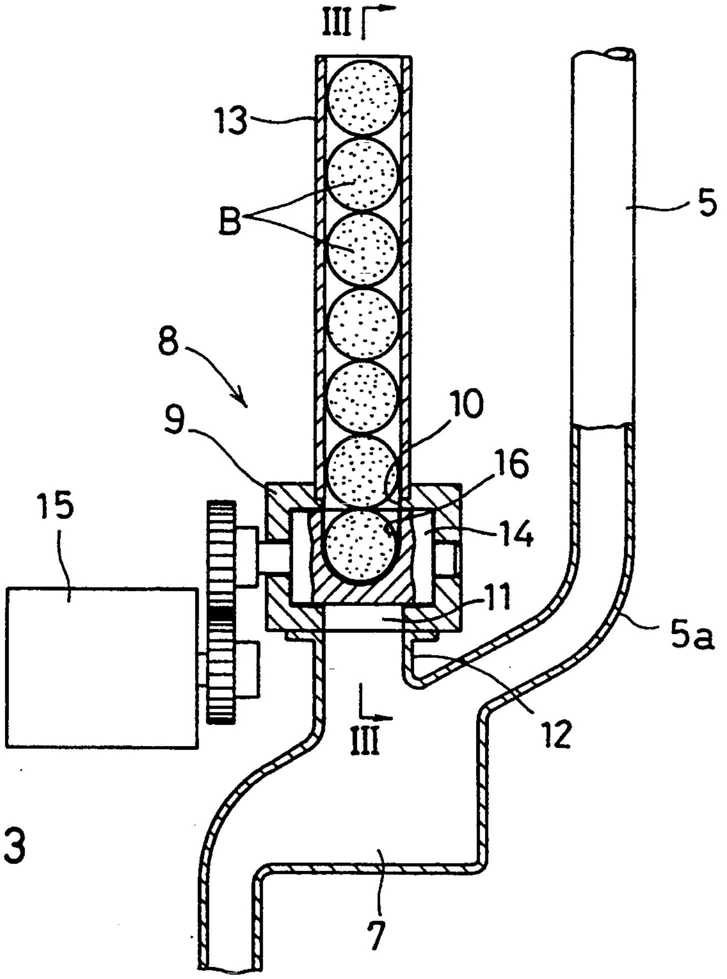
FIG. 2 is a sectional view showing the tablet supply unit of the same.
Figure 3:
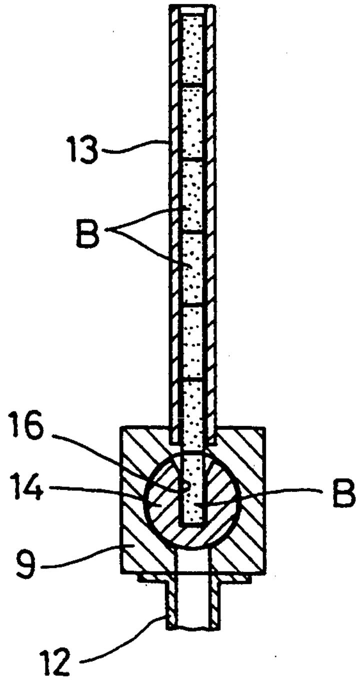
FIG. 3 is a sectional view taken along line III—III of FIG. 2.
Figure 4:
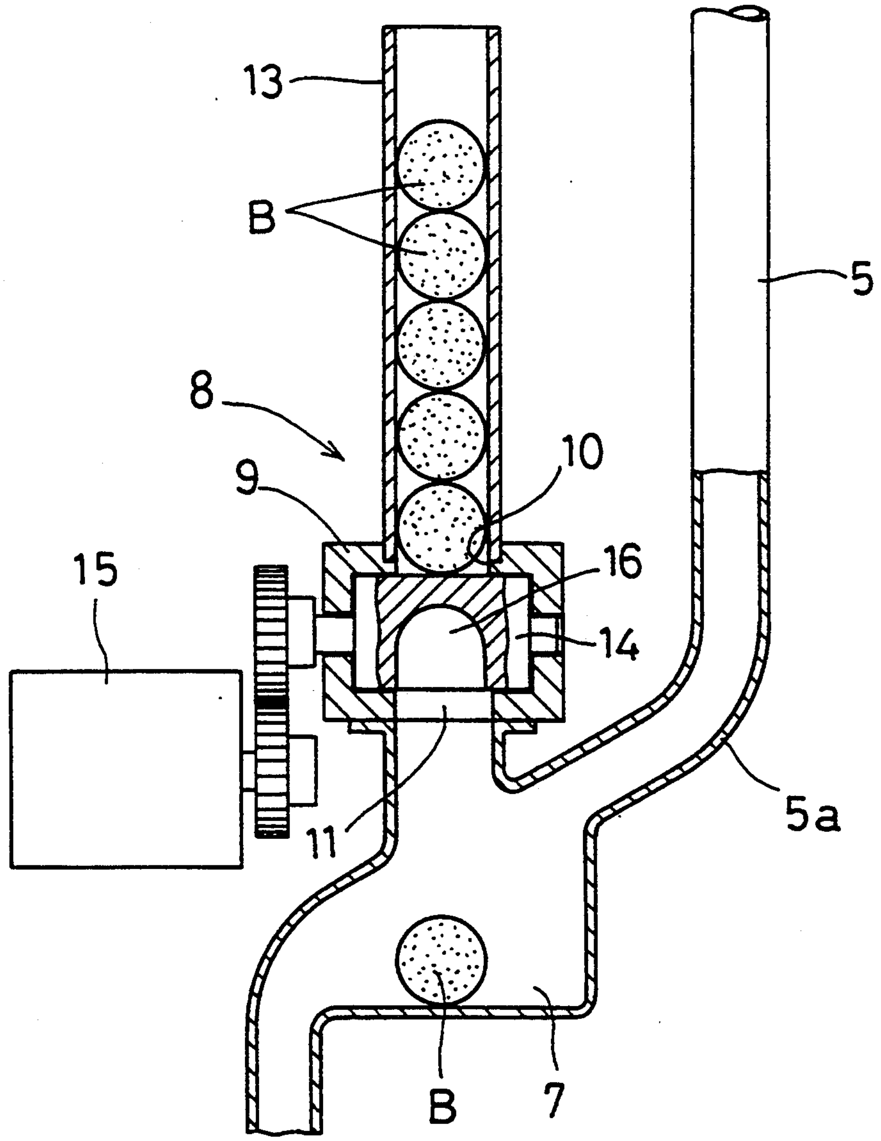
FIG. 4 is a sectional view showing an operational state/the tablet supply unit of the same.
Figure 5:
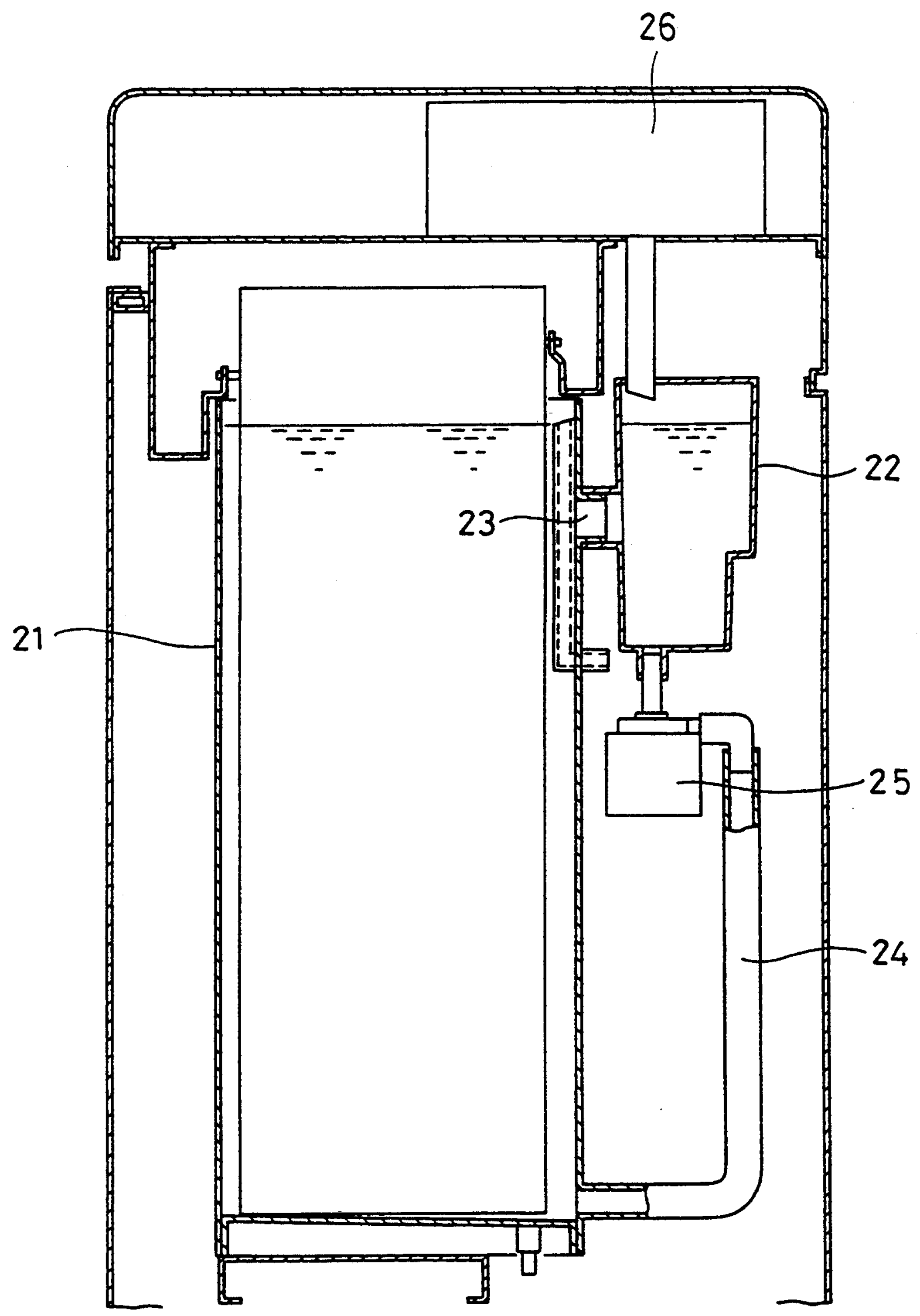
FIG. 5 PRIOR ART
FIG. 5 is a sectional view showing a conventional automatic developing machine.

FIGS. 2 and 3 show details of the tablet supply unit 8. It has a rotor case 9 provided with a tablet inlet 10 at its top and a tablet outlet 11 at its bottom. The outlet 11 is connected to a guide sheath 12 rising from the inclined portion 5*a*.

A tablet case 13 has its bottom end connected to the inlet 10 of the rotor case 9. A plurality of tablets B are stacked one on another in the tablet case 13.

A rotor 14 is rotatably mounted in the rotor case 9. The rotor 14 is rotated by a motor 15.

In the outer circumferential surface of the rotor 14 is formed a recess 16 capable of accepting one tablet B at a time. As the rotor 14 rotates, the recess 16 will be alternately brought into communication with the inlet 10 and the outlet 11.

In the state of FIG. 2, the recess 16 communicates with the inlet 10, so that the lowermost one of the tablets B in the tablet case 13 drops through the inlet 10 into the recess 16. In this state, the outlet 11 is closed by the rotor 14, so that any gas that may generate from the solution in the supply passage 5 will never flow into the tablet case 13. Since the tablets B are kept out of contact with the gas, they will never stick together.

To adjust the concentration of the solution, the rotor 14 is turned 180° until the recess 16 communicates with the outlet 11 to supply the tablet B through the outlet 11 into the tablet-reception area 7, while circulating the solution by means of the pump 6. The tablet B is thus put into the solution flowing through the inclined portion 5*a* and dissolves therein.

What is claimed is:

1. An automatic developing machine for photosensitive materials comprising a treating tank, a sub-tank communicating with said treating tank through a return passage and a supply passage, a circulating pump provided in said supply passage to circulate a treating solution between said treating tank and said sub-tank, and a tablet supply unit for supplying tablets containing components necessary for the treatment of photosensitive materials, said tablet supply unit being connected to said supply passage.

2. An automatic developing machine for photosensitive materials as claimed in claim 1 wherein said tablet supply unit comprises a rotor case having a top inlet and a bottom outlet located opposite to each other, a rotor rotatably mounted in said rotor case and formed in circumferential surface thereof with a recess adapted to be alternately brought into communication with said inlet and said outlet, and a tablet case having its bottom connected to said inlet of said rotor case for containing said tablets stacked one on another, said bottom outlet formed in said rotor case communicating with said supply passage.

* * * * *